(12) United States Patent
Schichtel

(10) Patent No.: US 10,988,654 B2
(45) Date of Patent: Apr. 27, 2021

(54) THERMAL STORAGE WITH PHOSPHORUS COMPOUNDS

(71) Applicant: Kraftblock GmbH, Sulzbach (DE)

(72) Inventor: Martin Schichtel, Saarbrücken (DE)

(73) Assignee: Kraftblock GmbH, Sulzbach (DE)

( * ) Notice: Subject to any disclaimer, the term of this patent is extended or adjusted under 35 U.S.C. 154(b) by 0 days.

(21) Appl. No.: 16/067,792

(22) PCT Filed: May 13, 2016

(86) PCT No.: PCT/EP2016/060848
§ 371 (c)(1),
(2) Date: Jul. 2, 2018

(87) PCT Pub. No.: WO2017/118493
PCT Pub. Date: Jul. 13, 2017

(65) Prior Publication Data
US 2019/0010374 A1    Jan. 10, 2019

(30) Foreign Application Priority Data
Jan. 4, 2016 (EP) .................... 16150083

(51) Int. Cl.
 C09K 5/00    (2006.01)
 C09K 5/06    (2006.01)
 F28D 20/00   (2006.01)
(52) U.S. Cl.
 CPC ............... *C09K 5/063* (2013.01); *C09K 5/00* (2013.01); *F28D 20/0056* (2013.01)

(58) Field of Classification Search
CPC ..................... F28D 20/0056; C09K 5/063
See application file for complete search history.

(56) References Cited

U.S. PATENT DOCUMENTS

| 4,043,987 A | * | 8/1977 | Jolicoeur ............... C07F 9/02 528/367 |
| 4,673,520 A | | 6/1987 | Hawe et al. |
| 5,496,529 A | * | 3/1996 | Fogel .................. C01B 25/36 423/305 |
| 5,785,885 A | * | 7/1998 | Kakiuchi ............... C09K 5/066 252/70 |

(Continued)

FOREIGN PATENT DOCUMENTS

| CN | 201125488 Y | 10/2008 |
| CN | 201362902 Y | 12/2009 |

(Continued)

OTHER PUBLICATIONS

International Preliminary Report on Patentability received in PCT Application No. PCT/EP2016/060848, dated Jul. 19, 2018.

(Continued)

*Primary Examiner* — Necholus Ogden, Jr.
(74) *Attorney, Agent, or Firm* — Knobbe, Martens, Olson & Bear LLP

(57) ABSTRACT

A composition for thermal storage includes at least one phosphor compound and water. At least part of the phosphor compound is an oligomer. The composition can be used in a hardened material thereof, a thermal storage device, a method for storing thermal energy, and a method for obtaining the aforementioned composition solid core particles.

17 Claims, 1 Drawing Sheet

(56) References Cited

U.S. PATENT DOCUMENTS

| | | | |
|---|---|---|---|
| 5,916,477 A * | 6/1999 | Kakiuchi | C09K 5/063 165/104.11 |
| 6,200,681 B1 * | 3/2001 | Jahns | C09D 7/65 428/402.24 |
| 2003/0050178 A1 * | 3/2003 | Agarwala | C04B 14/32 501/96.3 |
| 2005/0234416 A1 | 10/2005 | Kropf et al. | |
| 2008/0008858 A1 | 1/2008 | Hong et al. | |
| 2009/0194002 A1 | 8/2009 | Maldonado et al. | |
| 2009/0283014 A1 * | 11/2009 | Schichtel | C04B 41/5092 106/287.13 |
| 2010/0269735 A1 | 10/2010 | Shichtel et al. | |
| 2012/0148845 A1 * | 6/2012 | Kouyama | C09K 5/063 428/402.24 |
| 2012/0183775 A1 | 7/2012 | Shinba et al. | |
| 2013/0270476 A1 | 10/2013 | Yang et al. | |
| 2013/0306268 A1 | 11/2013 | Ducheyne et al. | |
| 2016/0251558 A1 * | 9/2016 | Eliyahu | C08L 19/00 252/74 |

FOREIGN PATENT DOCUMENTS

| | | |
|---|---|---|
| CN | 201531081 U | 7/2010 |
| CN | 103384809 A | 11/2013 |
| DE | 2162747 A1 | 12/1973 |
| DE | 10 2011 083 735 A1 | 4/2013 |
| DE | 10 2012 003 267 A1 | 8/2013 |
| DE | 10 2012 218 634 A1 | 4/2014 |
| EP | 0 140 467 B1 | 5/1989 |
| EP | 2 123 730 A1 | 11/2009 |
| GB | 2137978 A | 10/1984 |
| JP | S58-167672 A | 10/1983 |
| JP | H03-47889 A | 2/1991 |
| JP | H06-330029 | 5/1993 |
| JP | H06-41522 A | 2/1994 |
| JP | 2008-526658 A | 7/2008 |
| JP | 5104836 B2 | 12/2012 |
| KR | 1998-0066434 A | 10/1998 |
| KR | 10-1233006 B1 | 2/2013 |
| WO | WO 01/87798 A2 | 11/2001 |
| WO | WO 2011/046081 A1 | 11/2001 |
| WO | WO 2002/049559 A2 | 6/2002 |
| WO | WO 2009/034031 A1 | 3/2009 |
| WO | WO 2012/101110 A1 | 8/2012 |
| WO | WO 2014/147491 A1 | 9/2014 |
| WO | WO 2015/189517 A1 | 12/2015 |

OTHER PUBLICATIONS

International Search Report received in PCT Application No. PCT/EP2016/060848, dated Sep. 1, 2016.

Written Opinion received in PCT Application No. PCT/EP2016/060848, dated Sep. 1, 2016.

Office Action issued in JP patent application No. 2018-553296, dated Apr. 3, 2020.

* cited by examiner

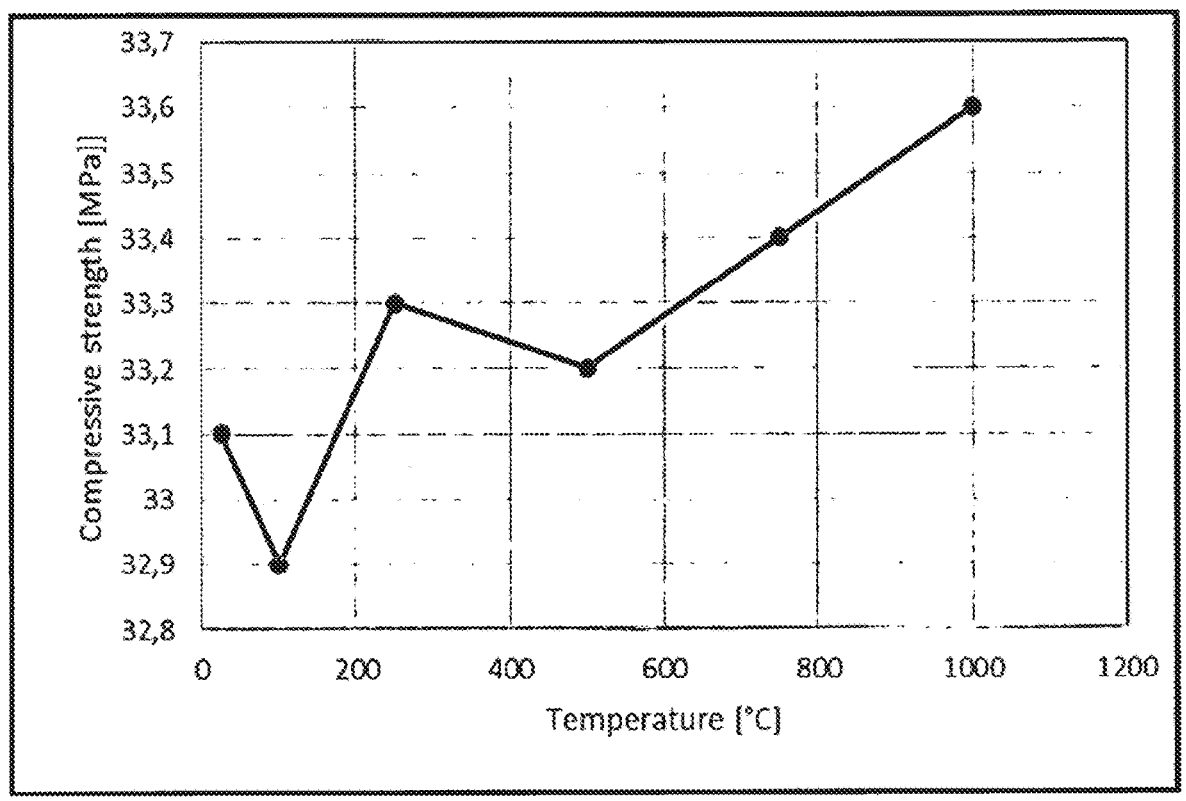

1

THERMAL STORAGE WITH PHOSPHORUS COMPOUNDS

This application is the U.S. National Phase under 35 U.S.C. § 371 of International Application No. PCT/EP2016/060848, filed May 13, 2016, designating the U.S., and published in English as WO 2017/118493 A1 on Jul. 13, 2017, which claims priority to European Patent Application No. 16150083.0, filed Jan. 4, 2016, the entire contents of which are incorporated herein by reference.

The invention pertains to a composition for thermal storage, a hardened material thereof, a thermal storage device, a method for storing thermal energy, and a method for obtaining the aforementioned composition.

Some prior art technologies use phosphates as phase change materials (e.g. phosphate salts that melt and crystallize or take up or free water of crystallization) to store and release heat upon changing their phase. Examples can be found in US 2008 000 8858 A1, DE 10 2011 083 735 A1, EP140467B1.

JP 5104836 B2 mentions phosphates as corrosion inhibitors.

KR 101 233 006 B1 mentions phosphates as an additive to asphalt.

WO2012101110A1 mentions storage and release of heat by polymerizing and hydrolyzing phosphates.

WO 2009 034 031 A1 describes building materials comprising phosphor compounds.

The thermal storages based on salts (like NaNO3) are quite expensive, since there is a need for corrosion resistant tubing and tanks. There is also a minimum temperature to avoid crystallization and degradation begins at a maximum temperature.

These current systems for storing and releasing heat all rely on latent heat storage (LHS). So far it has been difficult to achieve sensible heat storage systems (SHS) with phosphor compounds.

Another disadvantage of current systems for storing and releasing heat comprising phosphor compounds is that they do not have sufficient physical toughness to be used as building materials.

Thermal storage systems based on concrete are limited to temperatures from 200° C. to about 400° C. Thermal storage systems based on ceramic materials are very expensive.

The problem according to the present invention is the provision of sensible heat storage systems (SHS) with phosphor compounds or material compositions useful for these systems that can be used as building materials.

In a first embodiment, the problem according to the present invention is solved by a composition for thermal storage, comprising solid core particles and at least one phosphor compound, wherein at least part of the phosphor compound is an oligomer.

This composition is very tough when hardened and can be used as building material, e.g. as a replacement for concrete. Also, this material when hardened exhibits a surprisingly high heat capacity so that it can be used in sensible heat storage systems (SHS).

A high material efficiency of raw materials is important. For example, consider the manufacturing process of phosphates. They usually are obtained by digestion of phosphate rock with sulfuric acid. The resulting phosphoric acid is passed to the chemical industry or food industry. The anion of sulfuric acid reacts with other components of the phosphate rock to yield a highly contaminated gypsum which is currently just discarded. This produces 4 top 5 tons of gypsum per tonne of $P_2O_5$. The remainder of the phosphate mixture is usually treated with ammonia and sold as fertilizer. After the separation of phosphates, the resulting raw material may as an example be used to provide an inorganic matrix by means of the inventive core-shell additives. In this matrix (after completion of polymerization) the previously discarded gypsum may as an example be used as filler. If the matrix material hardens, more than 90 wt. % of water can be released back into the environment in a purified form. This is an almost 100% use of the raw material, in this case, the phosphate rock to yield the composition according to the present invention. In this example, the gypsum landfill (or the load of the oceans with waste water) can be significantly reduced. Material efficiency goes hand in hand with eco-efficiency. In theory, the materials produced according to the present invention can be disintegrated and can thus enter into a recycling loop.

The Composition

Preferably, the composition comprises
 a. core particles with a shell comprising at least one shell phosphor compound bound to the core particles by chemisorption or physisorption, and
 b. at least one matrix phosphor compound,
wherein at least part of the at least one shell phosphor compound and/or the at least one matrix phosphor compound is an oligomer.

Preferably, the composition according to the present invention is capable of flowing and most preferably liquid.

Preferably, the composition according to the present invention is aqueous. The solid content in the composition according to the present invention is preferably within a range of from 30 to 60 wt. %, more preferably in a range of from 40 to 50 wt. %. The advantage of this preferred range is an optimal viscosity for handling and manufacture. It is also easy to control the reaction conditions during hardening. Another advantage is that the distance between particles is better, so that they are not too close so that a gel would be forming.

Alternatively, for applications like building thermal storage devices, it may also be feasible to have solid contents of up to 90 wt. %. The lower limits of above mentioned preferred ranges would also apply in these cases.

BRIEF DESCRIPTION OF THE DRAWING

The invention will be described in more detail below with the help of the accompanying drawing, which shows in:

FIG. 1 a graph illustrating the relation between compressive strength and temperature determined with respect to one embodiment of the invention.

The Core Particles

The median diameter of the core particles (d50) is preferably within a range of from 1 to 10 μm. This diameter and the particle size distribution can be measured with a light microscope under typical conditions. Smaller particles had the severe disadvantage that the composition would be more reactive and the shrinkage during hardening would be more severe. This could lead to stress cracking and imprecision of prefabricated parts.

The core particles preferably consist of material with an oxidic, hydroxydic, oxihydroxidic, and/or polar surface. The surface may also exhibit organic groups such as glycosides or amines.

Preferably, the surface density of hydroxyl groups or polar groups is at least 2.4 μmol/mm². The surface density of hydroxyl-groups may be obtained as described in WO 2002049559 A2.

Preferably, the core particles consist of material with an oxidic surface and exhibit a median diameter of the core particles (d50) within a range of from 0.1 to 10 µm, more preferably within a range of from 1 to 10 µm. Outside this range, it is possible that the (maybe in combination with a lower water content) processing time and time for building final products (e.g. hardening time) is too short, so that it is not possible to build larger structures such as thermal storage devices. The network inside the hardened product may be too rigid, when particles outside this preferred range are used. The particles within this preferred range allow for a more flexible network in the hardened product, which may be needed in cases of thermal storage devices, where thermal expansion may otherwise lead to cracks. Finer particles also would need more binder which would make it economically less interesting.

Preferably, the core particles have a shell comprising at least one phosphor compound.

Preferably, the surface of the core particle is pretreated with a reactive species. This reactive species can be selected from the group of monophosphate, diphosphate or silane. This increases reactivity of the core particle when exposed to the phosphor compound according to the present invention such as oligomers. Another advantage would be the possibility to build continuous structures.

The composition according to the present invention preferably comprises core particles in an amount within 1 to 30 wt. %.

The core particles may e.g. also comprise at least a fraction of functional particles such as magnetite particles. This allows for adding interesting physical properties to the final product.

The Phosphor Compound

Preferably, the molecule of the at least one phosphor compound, and in particular the at least one shell phosphor compound and/or the least one matrix phosphor compound, comprises 15 to 50 mol. %, more preferably 20 to 40 mol. % hydrogen.

Preferably, the molecule of the at least one phosphor compound, and in particular the at least one shell phosphor compound and/or the least one matrix phosphor compound, comprises 5 to 30 mol. %, more preferably 10 to 25 mol. % phosphor.

Preferably, the molecule of the at least one phosphor compound, and in particular the at least one shell phosphor compound and/or the least one matrix phosphor compound, comprises 35 to 65 mol. %, more preferably 40 to 60 mol. % oxygen.

Preferably, the molecule of the at least one phosphor compound, and in particular the at least one shell phosphor compound and/or the least one matrix phosphor compound, comprises 10 to 25 mol. % phosphor, 20 to 40 mol. % hydrogen, and 40 to 60 mol. % oxygen, wherein the content of the three types of atoms cannot exceed 100 mol. %.

Preferably, the at least one phosphor compound, and in particular the at least one shell phosphor compound and/or the least one matrix phosphor compound, is selected from the group of metaphosphates, oligophosphates, polyphsophates, single phosphates, or mixtures thereof, or mixtures thereof including monomers comprising phosphor or monophosphates.

Preferably, the at least one oligomer or oligophosphate contains 3 to 50, more preferably 6 to 12 repeating units.

Preferably, the composition according to the present invention comprises at heat one phosphor compound as an oligomer with 8 to 14 repeating units based on the following acids $HPO_3$, $HPO_2$, $H_4P_2O_6$, $H_4P_2O_5$, $H_4P_2O_4$, $H_3PO_3$, $H_3PO_4$, $H_4P_2O_7$, $H_3PO_5$, $H_3PO_6$, $H_4P_2O_8$, or mixtures thereof. It has been shown that the resulting thermal storage device will then be physically and thermally more stable. The content of this particular oligomer in the composition is preferably in a range of from 20 to 80 wt. %.

Preferably, the composition comprises an oligomer or oligophosphate comprising organic repeating units. This has the advantage that the thermal storage device can be insulated using these oligomers as part of the material on the outer edge of the thermal storage device.

The monomer comprising phosphor or the monophosphate or the repeating unit of the metaphosphates, oligomers, oligophosphates, or polyphsophates is preferably selected from the group of $HPO_3$, $HPO_2$, $H_4P_2O_6$, $H_4P_2O_5$, $H_4P_2O_4$, $H_3PO_3$, $H_3PO_4$, $H_4P_2O_7$, $H_3PO_5$, $H_3PO_6$, $H_4P_2O_8$, salts thereof, or mixtures thereof.

The salts can preferably be salts of alkali metals, earth alkali metals, group 13 metals of the periodic system (e.g. Al).

The at least one shell phosphor compound is preferably an oligomer. This oligomer of the at least one shell phosphor compound preferably contains 3 to 50, more preferably 6 to 12 repeating units. Longer oligomers are difficult to obtain in aqueous compositions. Shorter oligomers surprisingly lead to a very dense and brittle material.

The at least one matrix phosphor compound is preferably an oligomer. This oligomer of the at least one matrix phosphor compound preferably contains 3 to 50, more preferably 6 to 12 repeating units. Longer oligomers are difficult to obtain in aqueous compositions. Shorter oligomers surprisingly lead to a very dense and brittle material.

The content of water of crystallization in the at least one phosphor compound, and in particular the at least one shell phosphor compound and/or the least one matrix phosphor compound, is preferably within a range of from 0 to 20 wt. %. More preferably, the at least one phosphor compound, and in particular the at least one shell phosphor compound and/or the least one matrix phosphor compound, does not contain water of crystallization. This has the advantage that the relative concentration of reactive compounds in the solution is higher. Another advantage is that the final product—the thermal storage device—does not seem to change its volume that much upon heating due to evaporation, when the phosphor compound has less water of crystallization. Also, build-up of cavities within the thermal storage device can be minimized.

Preferably, the ratio of oligomeric to monomeric phosphor compound, and in particular of the at least one shell phosphor compound and/or of the least one matrix phosphor compound, is preferably at least 1:1, more preferably at least 10:1.

The composition according to the present invention preferably comprises the at least one phosphor compound in an amount within 5 to 50 wt. %.

The composition according to the present invention preferably comprises the at least one shell phosphor compound in an amount within 0.1 to 5-10 wt. %.

The composition according to the present invention preferably comprises the at least one matrix phosphor compound in an amount within 5 to 50 wt. %.

Preferably, the at least one oligomer as the shell phosphor compound has less repeating units than the oligomer as the matrix phosphor compound. Shorter chains in the shell phosphor compound has the advantage of more coupling groups on the surface and therefore better adherence of the matrix phosphor compounds, which in turn would lead to a more homogenous structure.

The weight ratio between the shell phosphor compound and the matrix phosphor compound is preferably within a range of from 1:10 to 1:100.

Other Components of the Composition

The composition according the present invention preferably also comprises filler. This way the composition becomes less expensive.

Preferably the filler is inert. The filler can preferably be selected from the group of fly ash, oxidic materials, basalt, cork, dried wood, grain such as spelt, nitrides, particulate polymer, granite, sand, glass, gypsum, metal and mixtures thereof. The grain may also be ground or milled.

Preferably, the specific heat capacity is at least 0.8 kJ/(kg*K). More preferably, the specific heat capacity is within a range of from 1 to 4 kJ/(kg*K).

The median diameter (d50) of the filler particles is preferably within the range of from 1 to 50 mm. This diameter and the particle size distribution can be measured with a light microscope under typical conditions. If the particles are too small, the resulting thermal storage may shrink a lot compared to the volume of the unhardened composition. This is undesirable.

The weight ratio of filler to core particles is preferably in a range of from 3:1 to 15:1.

The composition preferably comprises filler in an amount within a range of from 20 to 90 wt. %.

The composition according to the present invention may preferably also comprise 0.001 to 1 wt. % of a transition metal halide (e.g. $FeCl_3$). It was found that certain phosphor compounds such as ring phosphates or metaphosphates will dissolve easier in an aqueous solution with this additive.

Preferably, also a promoter is present in an amount of 0.1 to 3 wt. % of the total weight of the core particle, the matrix phosphor compound and the shell phosphor compound. The promoter can preferably be a basic mineral, an alkali or earth alkali cation, and/or a mineral acid. This increases the speed and completeness of the hardening process.

The composition may also comprise 0.001 to 1 wt. % of defoaming, deaerating agents, and/or dispersing agent.

The total amount of other components of the composition according to the present invention besides core particles and phosphor compounds and fillers is in a range of from 0 to 5 wt. %.

Other Embodiments

In another embodiment of the invention, the problem according to the present invention is solved by a hardened material, characterized in that it comprises a hardened composition according to the present invention, where at least 90 wt. % of the water has been removed.

An advantage over previously known materials for thermal storage is the very high compressive strength of at least more than 25 MPa at 1000° C.

In another embodiment of the invention, the problem according to the present invention is solved by a thermal storage device comprising the hardened composition according to the present invention.

The advantage of the inventive thermal storage device is that any type of heat carrier like steam, air, gas, salts or oil generally known as HTF (Heat Transfer Fluid) can be used, since the thermal storage device with the hardened composition is basically a solid block of material, or at least a defined volume of storage-grains.

Preferably, the thermal storage device is a thermal energy storage (TES), more preferably a sensible heat storage system (SHS).

The thermal storage device according to the present invention may comprise an insulation layer covering at least 50%, preferably at least 99%, of the outer surface of the thermal storage device.

Preferably at least 50%, more preferably at least 99%, of the outer surface of the insulation layer is preferably covered with a waterproof layer. This allows the thermal storage device being employed underground without the risk of groundwater leaking into the insulation layer.

The insulation layer may be based on any typical insulating material, such as polymer (e.g. PU foam) or inorganic materials such as perlite, expanded clay or expanded glass. The material can be chosen to suit the maximum temperature of the thermal storage device.

Surprisingly, it has been found that covering expanded glass granules with the at least one matrix phosphor compound increase the melting temperature from around 700° C. to more than 1200° C. Therefore, it is preferred that the insulation layer comprises expanded glass granules that are covered with the at least one phosphor compound. Fillers may also be comprised in the covering layer.

More preferably, the expanded glass granules may be coated or covered with a composition according to the present invention. This has the advantage that the temperature resistance of the expanded glass granules can be improved up to 1400° C.

Preferably, at least one sublayer within the insulation layer comprises the at least one matrix phosphor compound. Preferably, this sublayer has a thickness in a range of 0.5 to 50 cm. Preferably, this sublayer also comprises expanded glass.

Preferably, the outer surface of this sublayer comprising the at least one matrix phosphor compound is at least partially covered with another sublayer of organic foam material (e.g. Polyurethane foam). Preferably this sublayer comprising organic foam material has a thickness in a range of 0.5 to 10 cm.

Preferably, the outer surface of this sublayer comprising the organic foam material or the sublayer comprising the at least one matrix phosphor compound is at least partially covered with another sublayer of reflective metal (e.g. aluminum foil). Preferably this sublayer comprising organic foam material has a thickness in a range of 0.01 to 10 mm.

The thickness of the insulation layer may preferably be in a range of from 0.5 to 5% of the largest diameter of the thermal storage device.

The insulation layer may comprise at least one hardened phosphor compound. This way it is possible to make the insulation layer thermally stable up to 1300° C.

In another embodiment of the invention, the problem according to the present invention is solved by a method for storing thermal energy by heating the thermal storage device according to the present invention.

In another embodiment of the invention, the problem according to the present invention is solved by a method for obtaining the composition according to the present invention, characterized in that the at least one phosphor compound comprising at least one oligomer is mixed with the solid core particles.

EXAMPLES

Composition 1

33 g of ammonium phosphate are dissolved in 100 ml water at a temperature of 50° C. No solids were visible after complete dissolution. 5 g of colloidal boehmite in water (23.5 wt. % in water, product NYACOL® AL20) were added dropwise. This mixture was homogenized with a dissolver (800 rpm, 8 cm toothed disk) for 5 minutes. 2.3 g of concentrated phosphoric acid were added. This mixture was stirred under reflux for 30 minutes. During that time, a first ester condensation reaction took place, reacting the phosphate monomers with the surface of the boehmite particles. Also at the same time, part of the phosphate monomers reacted with each other to form oligomers with varying count of repeat units mostly between 6 and 12.

Composition 2

30 g of sodium hexametaphosphate are dissolved in 100 ml water at room temperature. 12 g of forsterite (particle size d50: 150 μm) were slowly added to the mixture. This mixture was homogenized with a dissolver (800 rpm, 8 cm toothed disk) for 12 minutes. The composition was then allowed to settle and visible solids were removed by decanting. $CO_2$ gas was then introduced into the mixture with bubbles to start the process of binding the phosphates to the surface of the particles. Doing that, silica and bicarbonate were obtained, which then started the reaction of oligomerization to form oligomers with varying count of repeat units mostly between 4 and 8 after about 4 h.

Composition 3

25 g of tetra potassium pyrophosphate (BK Guilini) were dissolved in 75 ml of water. In a different beaker, 5 g of quartz dust (Omega Minerals, Omega 800) was dispersed in phosphoric acid water (pH 3) and allowed to settle for 30 minutes. Both solutions were then combined under strong stirring. An exothermic reaction was observed, wherein the medium strong base was grafted onto the "acidic" core particle (quartz) over the isoelectric point. So in a first step, the core-shell particle was formed, which then reacted further with the excess phosphate to yield the composition according to the present invention. Oligomers with an average repeat unit count of 4 to 14 were obtained.

Hardened Composition

This example used the composition 3. However, similar results were achievable by using compositions 1 or 2.

600 g granite grit (granulation 1-3 mm), 600 g soapstone (granulation 0.5-1 mm), and 360 g boron nitride (granulation: fine powder) were mixed in an Eirich-Labormischer EL1 for 30 seconds. Then, 828 g of composition 3 were added. The mixture was mixed for another 30 seconds. During mixing, 12 g defoaming agent (Tego Airex 905W) were added to prevent loss of $CO_2$ from the mixture and to prevent air being introduced into the mixture. This mixture was poured into moulds (40 mm×40 mm×40 mm) and then it was allowed to harden.

After 1 h, an increase in compressive strength is noticeable. After 24 hours, a compressive strengths of 28.5 MPa was achieved. After 48 h, a compressive strength of 33.1 MPa was achieved. Testing compressive strength after 28 days did not show a significant change. Residual moisture (water content) was 6.4 wt. % after 24 h, 5.6 wt. % after 48 h, and less than 3 wt. % after a week. The density was at 2.73 g/cm³. Porosity was at 0.5 vol. %. Pots rosity was measured with air content measurement device for measuring the content of air and pores in fresh concrete according to DIN 1048-1, DIN EN 12350-7, ASTM C 231 and BS 1881.

Thermal Storage Device

The test cubes of 40 mm×40 mm×40 mm obtained by hardening the composition 3 as described above were then subjected to heat. The cubes were heated from 50° C. to 800° C. and then cooled. This cycle was repeated 1000 times. The compressive strength did not change significantly during heating (see FIG. 1) and actually increased with temperature. Compressive strength was measured at temperatures up to 1000° C.

These tests revealed that the volume specific heat capacity of the test cubes was at 0.98 kWh/m³K (compared to heat storage made from concrete at 0.63 kWh/m³K). Heat conductivity slightly decreases with temperature. The heat conductivity at room temperature was 1.75 W/mK, the heat conductivity at 500° C. was 1.6 W/mK and the heat conductivity at 800° C. was at 1.48 W/mK.

Test revealed that replacing fillers with gypsum and whole spelt meal that the volume specific heat capacity could be increased to 1.2 kWh/m³K.

With different components it was also possible to increase the compressive strength to 65 MPa.

These experiments showed that this type of thermal storage device could actually act as a foundation for building, if properly insulated.

A test cube was housed in a 1.5 cm thick layer of a hardened composition comprising expanded glass as a filler in the hardened composition as described above. The granite grit, the soapstone and the boron nitride in the example above where simply replaced with expanded glass (four fractions: 60 wt. % with d50 3 mm, 20 wt. % with d50 1.5 mm, 5 wth. % with d50 0.5 mm, and 15 wt. % with d50 0.5 mm). This layer was then covered with a layer of 1 cm thick regular polyurethane foam. This layer of polyurethane foam was then covered in regular aluminum foil. One of the faces was then cut away with a sharp knife to yield a lid. The cube was then extracted from the insulating housing.

A test cube was heated to 900° C. for 48 h in a muffle furnace. It was then placed inside the insulating housing as described above and the insulating housing was closed with the lid. After 2 h, the inner temperature was 870° C. After 2 weeks the inner temperature was 840° C. After 4 weeks the inner temperature was 803° C. After 6 weeks the inner temperature was 771° C. The temperature decreased only 12% during that time.

The features in the present description, the figures and the claims can be construed as such or in any combination with each other. The disclosed features may be important for the present invention in any possible combination that could be worked by the skilled person.

What is claimed is:

1. A composition for thermal storage, comprising:
    a. solid core particles,
    b. a shell surrounding each core particle, said shell comprising at least one shell phosphorous-containing oligomer, wherein the shell phosphorous-containing oligomer is bound to the core particles by chemisorption or physiosorption, and
    c. a matrix comprising at least one matrix phosphorous-containing oligomer,
    wherein the number of repeating units in the at least one shell phosphorous-containing oligomer is less than the number of repeating units in the matrix phosphorous-containing oligomer.

2. The composition according to claim 1, having a solid content within a range from 30 to 60 wt. %.

3. The composition according to claim 1, wherein the core particles have a median diameter within a range from 1 to 10 μm.

4. The composition according to claim 1, wherein the core particles have a surface pretreated with a reactive species.

5. The composition according to claim 1, wherein the at least one shell phosphorous-containing oligomer contains 3 to 50 repeating units.

6. The composition according to claim 1, wherein a content of water of crystallization in the at least one matrix phosphorous-containing oligomer or the at least one shell phosphorous-containing oligomer is within a range of from 0 to 20 wt. %.

7. The composition according to claim 1, wherein the composition also comprises a filler.

8. The composition according to claim 7, wherein the filler particles have a median diameter within a range from 1 to 50 mm.

9. The composition according to claim 1, wherein the composition is capable of flowing.

10. The composition according to claim 1, wherein the composition is a hardened material, which comprises a hardened composition in which at least 90 wt. % of the water has been removed.

11. A thermal storage device comprising the hardened composition according to claim 10.

12. A method for storing thermal energy, comprising delivering the thermal energy to the thermal storage device according to claim 11 by heating said thermal storage device.

13. A method for obtaining the composition according to claim 1, comprising mixing the at least one shell phosphorous-containing oligomer with the solid core particles.

14. The composition according to claim 9, wherein the composition is a liquid.

15. The composition according to claim 1, wherein the ratio of the shell phosphorous-containing oligomer to the matrix phosphorous-containing oligomer is in a range from 1:10 to 1:100.

16. The composition according to claim 1, wherein the core particles comprise a material having polar groups.

17. The composition of claim 16, wherein a surface density of the polar groups on the core particle is at least 2.4 µmol/mm$^2$.

* * * * *

UNITED STATES PATENT AND TRADEMARK OFFICE
CERTIFICATE OF CORRECTION

PATENT NO. : 10,988,654 B2
APPLICATION NO. : 16/067792
DATED : April 27, 2021
INVENTOR(S) : Martin Schichtel It is certified that error appears in the above-identified patent and that said Letters Patent is hereby corrected as shown below:

In the Drawings

On Sheet 1 of 1, FIG. 1, Y-axis, Line 1, delete "[MPa]]" and insert --[MPa]--.

On Sheet 1 of 1, FIG. 1, Y-axis, Line 1, delete "33,7" and insert --33.7--.

On Sheet 1 of 1, FIG. 1, Y-axis, Line 2, delete "33,6" and insert --33.6--.

On Sheet 1 of 1, FIG. 1, Y-axis, Line 3, delete "33,5" and insert --33.5--.

On Sheet 1 of 1, FIG. 1, Y-axis, Line 4, delete "33,4" and insert --33.4--.

On Sheet 1 of 1, FIG. 1, Y-axis, Line 5, delete "33,3" and insert --33.3--.

On Sheet 1 of 1, FIG. 1, Y-axis, Line 6, delete "33,2" and insert --33.2--.

On Sheet 1 of 1, FIG. 1, Y-axis, Line 7, delete "33,1" and insert --33.1--.

On Sheet 1 of 1, FIG. 1, Y-axis, Line 9, delete "32,9" and insert --32.9--.

On Sheet 1 of 1, FIG. 1, Y-axis, Line 10, delete "32,8" and insert --32.8--.

In the Specification

In Column 5, Line 5, delete "according" and insert --according to--.

In Column 7, Line 25, delete "Guilini" and insert --Giulini--.

In Column 7, Line 58, delete "Pots rosity" and insert --Porosity--.

Signed and Sealed this
Twenty-sixth Day of October, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 10,988,654 B2

In Column 8, Line 25, delete "wth. %" and insert --wt. %--.

In the Claims

In Column 8, Claim 1, Line 51, delete "physiosorption," and insert --Physisorption,--.